Figure 1:
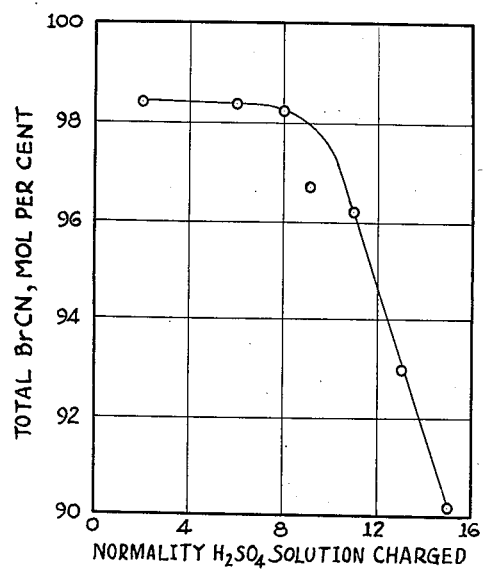

March 21, 1950  R. H. HARTIGAN  2,500,946
PROCESS FOR MAKING BROMINE CYANIDE
Filed Sept. 19, 1946

INVENTOR.
RAYMOND H. HARTIGAN.
ATTORNEY.

Patented Mar. 21, 1950

2,500,946

UNITED STATES PATENT OFFICE 2,500,946

PROCESS FOR MAKING BROMINE CYANIDE

Raymond H. Hartigan, Pittsburgh, Pa., assignor to Koppers Company, Inc., Pittsburgh, Pa., a corporation of Delaware Application September 19, 1946, Serial No. 697,956

5 Claims. (Cl. 23—19)

This invention relates to cyanogen bromide. More particularly the invention relates to the manufacture of cyanogen bromide by the bromination of sodium cyanide.

Cyanogen bromide is a solid at ordinary atmospheric temperatures having a melting point of 52° C. and a boiling point of 61.2° C. This solid material, therefore, may be advantageously handled and used for the manufacture of cyanuric bromide and melamine.

In volume XI, "Organic Synthesis" (1931) page 30, Hartman and Dreger describe a process for the bromination of sodium cyanide directly with elemental bromine. The yields of cyanogen bromide obtained by their process vary from 73% to 85% of the theoretical cyanogen bromide available.

The primary object of the present invention is to provide a process of brominating sodium cyanide to obtain a substantially theoretical yield of cyanogen bromide.

Another object of the invention is to provide a process by which sodium cyanide may be easily brominated without the loss of products to obtain a high quality cyanogen bromide.

With these and other objects in view, the invention consists in the process of producing cyanogen bromide as hereinafter described and particularly defined in the claims.

In the bromination of sodium cyanide with elemental bromine some or all of the following reactions occur:

1. $Br_2 + NaCN = BrCN + NaBr$ 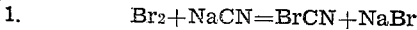

A part of the cyanogen bromide prepared as in Equation 1 may be decomposed by hydrolysis to ammonium bromide in accordance with the following equation:

2. $BrCN + 2H_2O = NH_4Br + CO_2$ 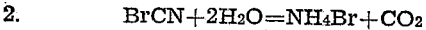

Further cyanogen bromide may have a metathetical reaction with sodium cyanide in accordance with the following equation:

3. $BrCN + NaCN = NaBr + (CN)_2$ 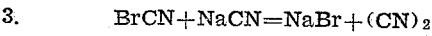

Some of the cyanogen formed by Equation 3 may, in turn, hydrolyze to azulmic acid and other products in accordance with equation:

4. $X(CN)_2 + Y(H_2O) =$ azulmic acid $+ NH_3 +$
   $HCOOH + (COOH)_2 + HCN + CO(NH_2)_2$ 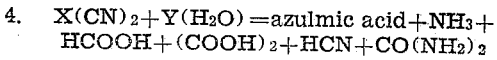

Furthermore sodium cyanide may react with water to produce a formate in accordance with the equation:

5. $NaCN + 2H_2O = HCOONa + NH_3$ 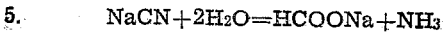

From Equations 1, 2 and 3 above it will be seen that the bromine which is not combined with the cyanogen radical as cyanogen bromide appears as inorganic bromides, such as HBr, NaBr and NH₄Br, and the yield of cyanogen bromide formed in the reaction is substantially reduced.

The reaction of Equation 2 is catalyzed by acid. The reaction of Equation 3 takes place in a neutral solution. Accordingly when the synthesis of cyanogen bromide is conducted in a sulphuric acid solution the reactions shown in Equations 3 and 4 are avoided. Furthermore, it is found that the reaction in Equation 5 is insignificant with a dilute acid solution.

The presence of acid during the reaction forms an important part of the present invention. Furthermore, it has been found that the strength of acid in the reaction mixture is very important in obtaining the most efficient reaction and the maximum yield. Experiments have shown that substantially theoretical yields may be obtained with 0.5 to 8.0 normal sulphuric acid present in the reaction mixture. Expressed in another way, the distillation residue should have a 0.3 to 4.3 normal sulphuric acid acidity.

In the absence of acid (preferably a mineral acid) it is probable that sodium cyanide and cyanogen bromide react to consume the cyanogen bromide. Furthermore in the absence of acid and with an excess of sodium cyanide, the sodium cyanide reacts with the cyanogen bromide to give a quantitative destruction of the cyanogen bromide.

To carry out the process in accordance with the preferred form of the invention the materials are reacted in the following proportions: one mol of bromine is added to 150 ml. of 2 normal sulphuric acid solution which is preferably placed within a mixer that may be provided with a cooling coil or a cooling jacket. The bromine mixture is cooled to a temperature of approximately 20° C. and to it is added 52-54 grams of sodium cyanide (95% pure) dissolved in 100 ml. of water. The sodium cyanide solution is slowly added to the bromine mixture and the reactants are mixed and cooled to maintain the temperature below 23° C. At the end of the reaction a clear solution of sodium bromide is formed in which a major portion of the cyanogen bromide is precipitated as white crystalline cyanogen bromide.

When the reaction is completed the cyanogen bromide may be directly distilled out of the reaction mixture. The reaction mixture contains a large amount of water and it is important to exclude water from the cyanogen bromide if a pure product is desired. The water may be removed from the cyanogen bromide vapors distilled out of the reaction mixture by passing the vapors through calcium chloride or other suitable dehydrating agent which is located in the fractionating tower. The cyanogen bromide is a product which may be readily polymerized to produce cyanuric bromide.

In Table I is shown the effect of the presence of different strengths of sulphuric acid which may be used in the bromination of sodium cyanide.

TABLE I

*The preparation of cyanogen bromide from bromine and sodium cyanide in a sulphuric acid medium*

[Effect of high acidity on the yield.]

| Size, Run, Moles | Normality $H_2SO_4$ Solution Charged | Total BrCN, Mol. Per cent |
|---|---|---|
| 1 | 2 | 98.4 |
| 2 | 4 | 98.5 |
| 1 | 6 | 98.4 |
| 1 | 8 | 98.2 |
| 1 | 9 | 96.7 |
| 1 | 11 | 96.2 |
| 1 | 13 | 93.0 |
| 1 | 15 | 90.2 |

In Table II are shown the yields of cyanogen bromide which are produced by the bromination of sodium cyanide when the strength of sulphuric acid is normal or less than normal.

TABLE II

*The preparation of cyanogen bromide from bromine and sodium cyanide in a dilute sulphuric acid medium*

[Effect of low acidity on the yield.]

| Normality $H_2SO_4$ Charged | Total BrCN, Mol. Per Cent |
|---|---|
| 0 | 93.0 |
| 0.1 | 95.5 |
| 0.25 | 96.3 |
| 0.5 | 97.0 |
| 0.75 | 97.4 |
| 1.0 | 97.3 |

In Table III is illustrated the effect of 30% excess of sodium cyanide on the yield of cyanogen bromide obtained when directly brominating sodium cyanide with elemental bromine without acid present and the bromination of the same amount of sodium cyanide under the same conditions when having 4-normal $H_2SO_4$ present.

TABLE III

*Preparation of cyanogen bromide from bromine and 30% excess sodium cyanide*

Run 1—67 g. NaCN dissolved in 110 ml. $H_2O$; 51.8 ml. $Br_2$; 150 ml. 4-N $H_2SO_4$.
Run 2—67 g. NaCN dissolved in 110 ml. $H_2O$; 51.8 ml. $Br_2$; 150 ml. $H_2O$.

| Run | Size of Run, Moles | Normality $H_2SO_4$ Solution Charged | Total BrCN, Mol. Per Cent |
|---|---|---|---|
| 1 | 1 | 4.0 | 98.8 |
| 2 | 1 | 0 | 69.0 |

These runs illustrate clearly the advantage of the presence of sulphuric acid in the reaction mixture.

The data of Table III show that an excess of 30% sodium cyanide in run 2, a practically quantitative amount of cyanogen bromide is destroyed. In run 1 when using the 30% excess of sodium cyanide sufficient sulphuric acid is present to take care of the entire excess of sodium cyanide, and therefore a substantially quantitative yield of cyanogen bromide is secured. It is important, therefore, to have present in the reaction mixture sufficient acid to react with the excess sodium cyanide in order to obtain the maximum yield of cyanogen bromide. A large number of tests have been made using stoichiometric proportions of bromine and sodium cyanide. It has been found that in such runs the yield of cyanogen bromide is between four and five percent lower than when sulphuric acid is present. It is desirable when obtaining the maximum yields of cyanogen bromide to use slight excess of sodium cyanide and have sufficient acid present in the reaction to take care of the excess sodium cyanide.

Figure 2:
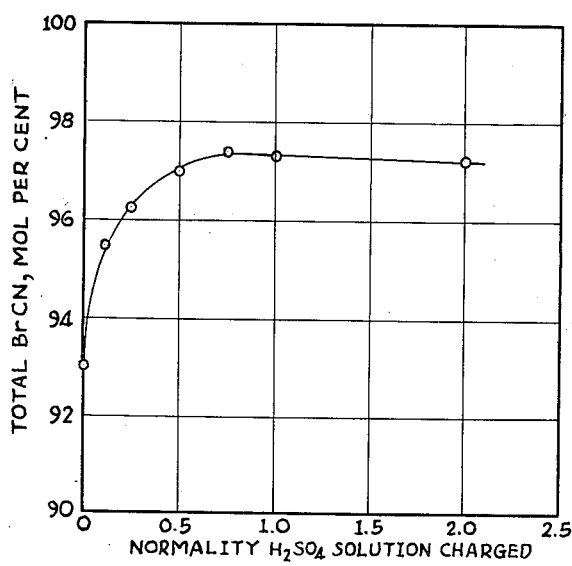

The graphs shown in the drawings are curves which are plotted from the data of Tables I and II. Figure 1 is made from the data of Table I and Figure 2 is made from the data of Table II. These graphs show the yield of cyanogen bromide produced by reactions taking place in different strengths of sulphuric acid. These curves illustrate clearly the fact that the use of 0.5 to 8 normal sulphuric acid gives an important and increased yield of product.

A large number of experiments have shown that in the absence of the sulphuric acid in the reaction mixture approximately 31% of the bromine is not recovered as cyanogen bromide when an excess of 30% sodium cyanide is used.

Experiments have also shown that if the reaction takes place in the presence of an alkali the cyanogen bromide is destroyed quantitatively.

The preferred form of the invention having been thus described, what is claimed as new is:

1. A process of making cyanogen bromide consisting in slowly reacting sodium cyanide with bromine water in the presence of an added reagent consisting of sulphuric acid having a concentration of 0.5 to 8.0 normal.

2. The process of making cyanogen bromide consisting in cooling bromine water to a temperature of approximately 20° C., slowly adding a water solution of sodium cyanide while maintaining a temperature below 23° C. in the presence of an added reagent consisting of sulphuric acid having a concentration between 0.5 and 8.0 normal.

3. The process defined in claim 2 in which the sulphuric acid concentration in the residue mixture is 0.3 to 4.3 normal.

4. A process of making cyanogen bromide while avoiding an oxidation reaction consisting in: cooling a mixture of bromine and sulphuric acid having a concentration between 0.5 and 8.0 normal to a temperature of approximately 20° C., slowly adding a reagent consisting of a water solution of sodium cyanide while maintaining the temperature of the reaction mixture below 23° C., thereafter distilling the reaction mixture and removing cyanogen bromide through a fractionating tower containing a drying agent to recover a dry cyanogen bromide.

5. The process of making cyanogen bromide consisting in: cooling bromine water to a temperature of approximately 20° C., slowly adding a water solution of sodium cyanide while maintaining a temperature below 23° C. in the presence of an added reagent consisting of sulphuric acid having a concentration between 0.5 and 8 normal, and distilling cyanogen bromide out of the reaction mixture.

RAYMOND H. HARTIGAN.

REFERENCES CITED

The following references are of record in the file of this patent:

UNITED STATES PATENTS

| Number | Name | Date |
|---|---|---|
| 666,135 | Goepner et al. | Jan. 15, 1901 |
| 1,938,324 | Dieterle | Dec. 5, 1933 |

FOREIGN PATENTS

| Number | Country | Date |
|---|---|---|
| 9,710 | Great Britain | of 1900 |

OTHER REFERENCES

"Cyanogen Compounds," by Williams; J. & A. Churchill, London (1915), pages 6 and 7.